(12) United States Patent
Huang et al.

(10) Patent No.: US 9,235,593 B2
(45) Date of Patent: Jan. 12, 2016

(54) TRANSMITTING FILESYSTEM CHANGES OVER A NETWORK

(75) Inventors: Mark Huang, Seattle, WA (US); Curtis Anderson, Saratoga, CA (US); R. Hugo Patterson, Los Altos, CA (US)

(73) Assignee: EMC Corporation, Hopkinton, MA (US)

( * ) Notice: Subject to any disclaimer, the term of this patent is extended or adjusted under 35 U.S.C. 154(b) by 479 days.

(21) Appl. No.: 12/895,827

(22) Filed: Sep. 30, 2010

(65) Prior Publication Data
US 2012/0084333 A1 Apr. 5, 2012

(51) Int. Cl.
*G06F 7/00* (2006.01)
*G06F 17/30* (2006.01)
*H04L 29/08* (2006.01)
*G06F 17/00* (2006.01)

(52) U.S. Cl.
CPC .... *G06F 17/30174* (2013.01); *G06F 17/30575* (2013.01); *G06F 17/30578* (2013.01); *H04L 29/0854* (2013.01)

(58) Field of Classification Search
CPC ............... G06F 17/30578; G06F 17/30575; H04L 29/0854
USPC .................. 707/613, 624, 999.001–999.005
See application file for complete search history.

(56) References Cited

U.S. PATENT DOCUMENTS

| | | | | |
|---|---|---|---|---|
| 6,029,168 A * | 2/2000 | Frey | | 707/999.008 |
| 7,600,125 B1 * | 10/2009 | Stringham | | 713/176 |
| 2001/0037323 A1 * | 11/2001 | Moulton et al. | | 707/1 |
| 2002/0178163 A1 | 11/2002 | Mayer | | |
| 2004/0267836 A1 * | 12/2004 | Armangau et al. | | 707/203 |
| 2006/0064470 A1 * | 3/2006 | Sargent et al. | | 709/219 |
| 2006/0172724 A1 * | 8/2006 | Linkert et al. | | 455/412.1 |
| 2006/0235847 A1 * | 10/2006 | Farlee et al. | | 707/7 |
| 2007/0244920 A1 | 10/2007 | Palliyil et al. | | |
| 2008/0022057 A1 * | 1/2008 | Shah et al. | | 711/162 |
| 2008/0034268 A1 * | 2/2008 | Dodd et al. | | 714/755 |
| 2009/0307251 A1 | 12/2009 | Heller et al. | | |
| 2010/0198799 A1 | 8/2010 | Krishnan et al. | | |

OTHER PUBLICATIONS

Tridgell et al. "The rsync algorithm", Department of Computer Science, Australian National University, Canberra, Australia, Nov. 9, 1998. http://rsync.samba.org/tech_report/.
Andrew Tridgell. "Efficient Algorithms for Sorting and Synchronization", A thesis submitted for the degree of Doctor of Philosophy at The Australian National University. Feb. 1999.

* cited by examiner

*Primary Examiner* — Kannan Shanmugasundaram
(74) *Attorney, Agent, or Firm* — Van Pelt, Yi & James LLP

(57) ABSTRACT

Transmitting filesystem changes over a network is disclosed. A hash of data comprising a chunk of directory elements comprising one or more consecutive directory elements in a set of elements sorted in a canonical order is computed at a client system. One or more directory elements comprising the chunk are sent to a remote server in the event it is determined based at least in part on the computed hash that corresponding directory elements as stored on the remote server are not identical to the directory elements comprising the chunk as stored on the client system.

22 Claims, 10 Drawing Sheets

US 9,235,593 B2

TRANSMITTING FILESYSTEM CHANGES OVER A NETWORK

BACKGROUND OF THE INVENTION

Techniques are known to synchronize a remote ("server") filesystem with a local ("client") filesystem across a network. The remote filesystem may be a near replica of the local filesystem; for instance, it may represent a recent backup of the local filesystem. To synchronize the remote filesystem with the local filesystem, for example to reflect any changes made to the local filesystem since a last synchronization, it is necessary to update the remote filesystem's structure, namespace, and metadata.

A typical "full" synchronization approach uses maximum network bandwidth but no additional local storage to synchronize the filesystem's structure, namespace, and metadata. The modification time ("mtime") and size of every file on the local filesystem is compared with the mtime and size of the file on the server. If the file does not exist or its mtime and/or size are different on the server, the client creates the file on the server and synchronizes the file content. The client also updates any other metadata (user ID ("UID"), group ID ("GID"), file permissions, etc.) associated with the file. Any files not specified by the client are deleted by the server. The popular utility "rsync" uses this approach.

A typical "incremental" synchronization approach uses less network bandwidth but some local storage. After a full synchronization, the client stores the current filesystem structure, namespace, and metadata in a "catalog" (typically a database). During an incremental synchronization, for every file, the client queries the catalog database first. If the file is not represented in the catalog or its mtime and/or size are different, the client creates the file on the server and synchronizes the file content. If the file is represented in the catalog and its mtime and size are the same, then its content is assumed to be unchanged, and the client just updates any other metadata associated with the file, if different than represented in the catalog. The client deletes any files on the server that are represented in the catalog but no longer exist on the local filesystem.

Another incremental approach uses about the same amount of network bandwidth but (usually) less local storage. Every operation on every file since the last backup is recorded in a filesystem "journal". To synchronize the remote filesystem, the journal is essentially played back like a recording. This eliminates the need to store the metadata for every file (since most files never change), but is more complicated and prone to synchronization error.

BRIEF DESCRIPTION OF THE DRAWINGS

Various embodiments of the invention are disclosed in the following detailed description and the accompanying drawings.

DETAILED DESCRIPTION

Figure 1:
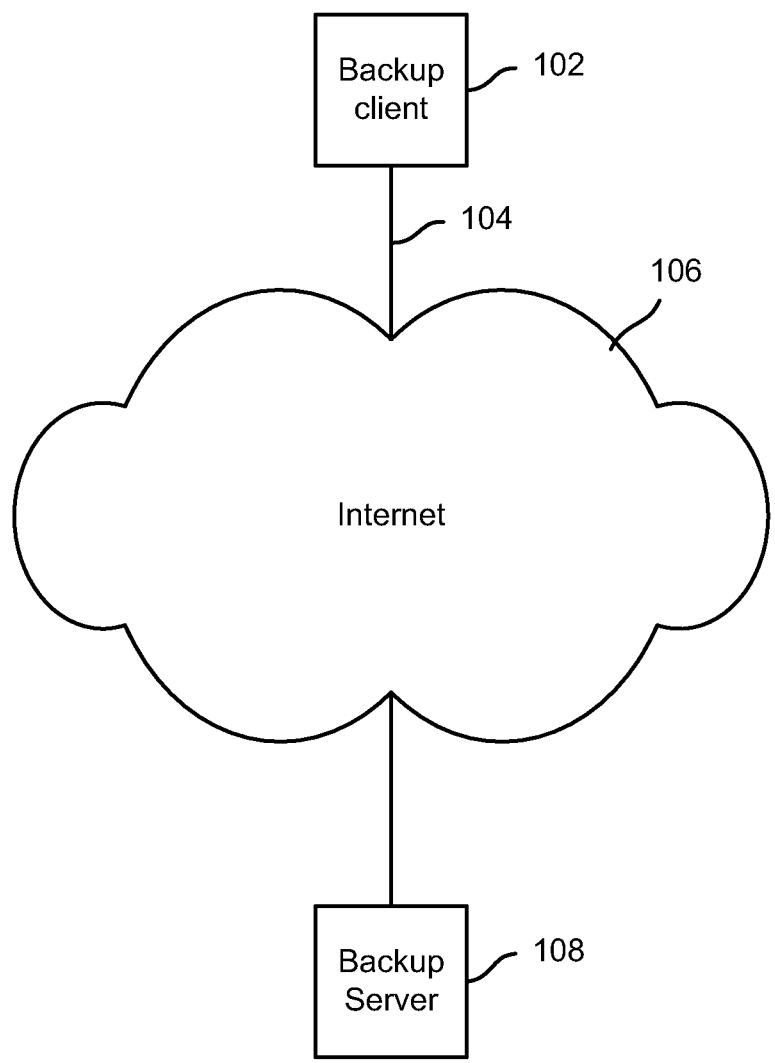
FIG. 1 is a block diagram illustrating an embodiment of a data storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transmitting filesystem changes across a network is disclosed. A local filesystem is replicated across a network, e.g., from a backup client system (which may itself be a production server, such as a file server) to a remote server. Synchronization of filesystem information, e.g., directory structure and other metadata, is maintained. In some embodiments, at the backup or other client to synchronize the filesystem information or a portion thereof, a canonical representation of metadata for each node (for example, each file in a directory) is created and the resulting directory (or other) elements are sorted in a canonical order, for example by file ID. The resulting sorted list of directory elements is divided into chunks. Data comprising each chunk is hashed and the result is compared to a corresponding value determined with respect to the corresponding directory information as stored on the server. If the information does not match the associated directory elements are sent to the server. If the information matches, in some embodiments a hash over a span of chunks is compared to a corresponding value determined based on corresponding filesystem information at the server, to ensure the server does not still have stored obsolete information that happens to fall between chunks, e.g., for a node or range of nodes that have been deleted at the client. In some embodiments, once a chunk (or in some embodiments span) hash has been determined to match, the value is stored in a hash cache at the client to avoid having to communicate with and use processing cycles at the server in the event the associated directory elements remain unchanged between synchronizations. In some embodiments, once chunks comprising an entire directory have been determined to be in sync a hash of the sorted list of directory elements comprising the entire directory is computed and stored in the hash cache, as a further optimization with respect to the commonly encountered case in which some or even many entire directories remain unchanged between synchronizations.

FIG. 1 is a block diagram illustrating an embodiment of a data storage system. In the example shown, a backup client 102 is connected via a connection 104 to the Internet (or other network) 106. A backup server 108 configured to back up filesystem data (e.g., files and associated filesystem structure and other metadata) on client 102 also is connected to the Internet (or other network) 106. Files and filesystem information are sent via the Internet (or other network) 106 from client 102 to server 108 to maintain synchronization between the filesystem replica stored on server 108 and the local filesystem on client 102. In this example a single client is shown, but in various embodiments a plurality of clients and/or filesystems may be replicated to server 108 via network 106. In the example shown, backup server 108 is represented as a single box, but in various embodiments server 108 may comprise multiple systems, such a coordinating server connected via network 106 or otherwise, e.g., by a separate network such as a storage area network (SAN) to one or more storage nodes configured to store files and/or other replicated filesystem data.

Figure 2:
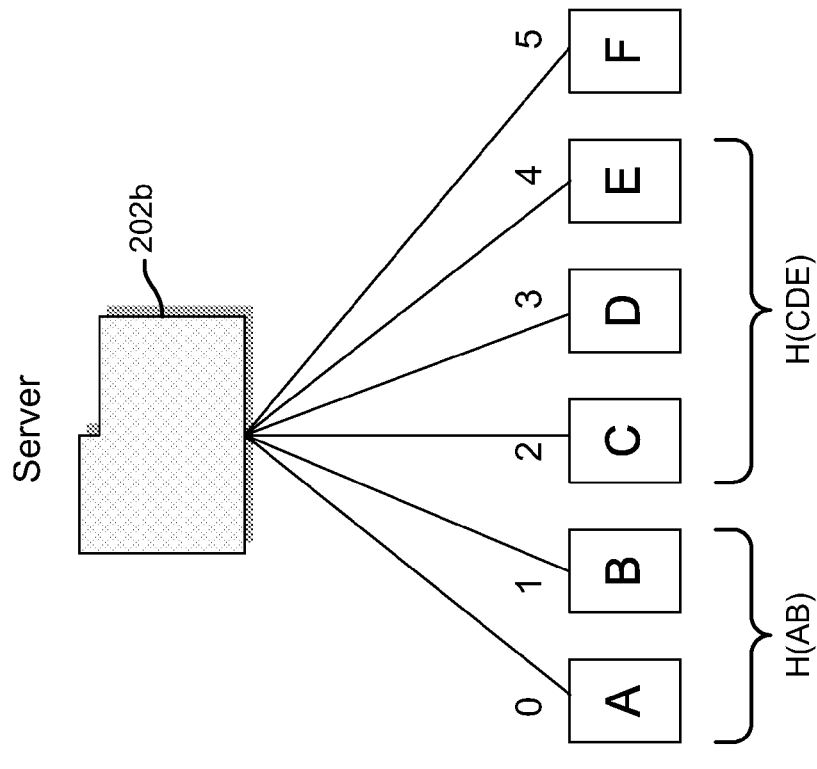
FIG. 2 is a block diagram illustrating an embodiment of a data storage system.
Figure 2:
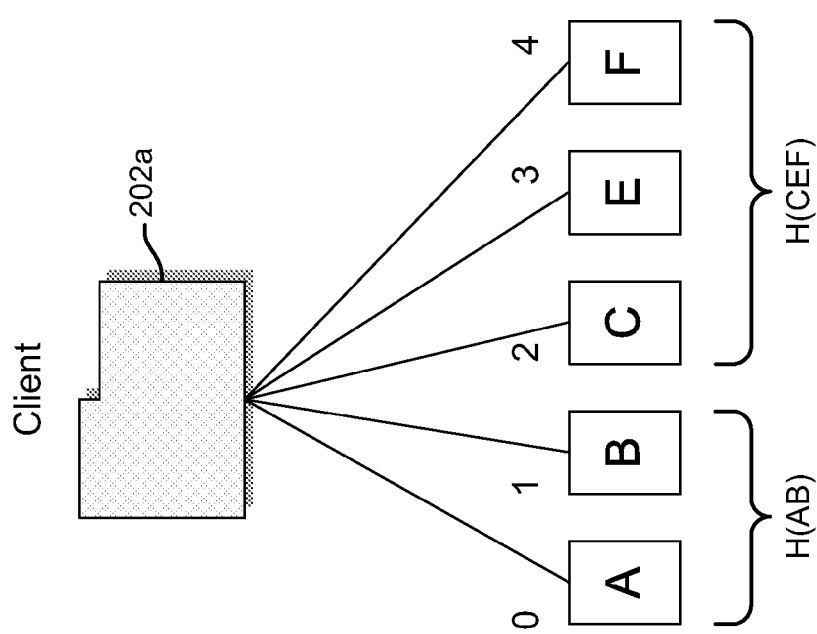

FIG. 2 is a block diagram illustrating an embodiment of a data storage system. In the example shown, a directory 202a on a client system is replicated across a network to a server and associated filesystem information represented by directory 202b is sent to the server and maintained in synchronization with the corresponding directory information 202a as changes to the local filesystem are made, if any, at the client. In the example shown, the directory 202a includes five files, denoted 0-4 and labeled as files A, B, C, E, and F, respectively, as shown in FIG. 2. The corresponding information at the server, represented by directory 202b, has in this example become out of sync with the directory information 202a. At directory 202b, the directory information indicates the directory includes six nodes, denoted 0-5 in FIG. 2, and identified as files A, B, C, D, E, and F. An example that could result in a state shown in FIG. 2 is where a file, such as file D, is deleted from the local filesystem between synchronizations.

In various embodiments, the approach described herein uses about the same amount of network bandwidth as, but less local storage than, the typical incremental approach, and is not as prone to error as the journaling approach. Instead of storing the full metadata for every file in a catalog, this method only stores a mapping of <file path, mtime, size> to <file ID> in a "file cache". Like a catalog, the file cache allows the client to detect which files are unchanged since the last backup. If a file is found in the file cache, then the file content is unchanged on the server and only the metadata (e.g. UID, GID, permissions, etc.) may need to be updated. To minimize local storage, however, the metadata is not stored in the file cache. Instead, metadata is simply assumed to change very rarely and is just verified.

Once all of the files in a directory have been either created (if new), updated (if changed), or found in the file cache (if unchanged), their associated metadata is read from the filesystem. A canonical representation of each file (a "DIRELEM") is formed from its metadata. The list of DIRELEMs in the directory is sorted by file ID and broken up into chunks. Each chunk is then "hashed" (or "fingerprinted"), and a "hash cache" is consulted to determine if the files represented by the chunk exist identically on the server.

If the hash of a chunk is not found in the hash cache, then it is unknown whether the files represented by the chunk exist on the server. The hash of the chunk, the offset of the first file represented by the chunk, and the number of files represented by the chunk, are sent to the server for verification. The server forms the same canonical representation of every file in the directory to be synchronized, and also sorts the list of DIRELEMs by file ID. The server calculates a hash over the DIRELEMs at the specified offset and compares it to the hash provided by the client. If the hashes are the same, then the files do not need to be updated. If the hashes are different, the client then sends the DIRELEMs for the specified chunk so that the server can update the metadata for the files, and/or delete files that no longer exist within the span of file IDs represented by the chunk. The client then adds the hash of the chunk to the hash cache.

If the hash of a chunk is found in the hash cache, then it is certain that the files represented by the chunk exist on the server, but the server may still need to delete old files that exist between the files represented by the chunk and those represented by the preceding chunk (if any). Thus when the hash of a chunk is found in the hash cache, the chunk is added to a "span", or running list of chunks that all exist on the server. If the hash of a subsequent chunk is not found in the hash cache, the span is synchronized with the server before the chunk is. As an optimization, if the end of the directory is reached, and the span covers all files in the directory, the hash of the span may be added to the hash cache (normally only hashes of chunks would be added), so that the server does not need to be consulted at all for the common case of an entire directory remaining unchanged between backups.

Referring further to FIG. 2, in the example shown the filesystem information for files in directory 202a and directory 202b are represented in the same canonical order, i.e., alphanumeric order based on the single letter file ID's A-F shown. In various embodiments the client 202a divides the stream of directory elements into chunks. In the example shown, directory elements A, B, C, E, F have been divided into a first chunk AB and a second chunk CEF. A hash of data comprising the directory elements in the first chunk AB is computed at the client. In some embodiments, a hash cache at the client is checked to determine whether the same chunk was confirmed to exist previously at the server, for example in a prior synchronization. If the hash is found in the cache, the client processes the next chunk. If the hash is not found in the hash cache (for example, because directory information has changed since a last synchronization), or in an embodiment in which a hash cache is not used, the hash and an associated offset identifying a location of the chunk within the ordered list of directory elements (for example in the example shown the offset information 0-1 indicating a range encompassed by the chunk) is sent to the server.

At the server, the information corresponding to the directory as stored at the server is sorted in the same canonical order as at the client. The server is configured to receive an offset and hash; compute a hash for corresponding records in the ordered list of directory elements as stored on the server; and return to the client a result indicating whether the computation at the server matched the hash value sent by the client.

At the client, if the response from the server indicates the hashes matched, the client adds the hash to the hash cache (if present) and processes the next chunk. If the response from the server indicates the hashes did not match, the client sends the directory elements comprising the chunk to the server and adds the hash to the hash cache (if present). In some embodiments, a previously generated span of consecutive chunks found in a hash cache, if any, also is synchronized, to detect any case in which an orphaned element or elements deleted from the local filesystem may remain in the filesystem information on the server but not otherwise be detected because they lie between chunks.

In the example shown in FIG. 2, the hash computed at the client for the chunk CEF corresponding to records 2-4 in the set would at the server be determined to not match the corresponding hash of records 2-4 on the server, since those records comprise the chunk CDE, not CEF. Note that in an embodiment in which a hash cache is used the hash of the chunk CEF would not be in the cache, since the contiguous chunk CEF would not have been found on the server (or in the cache) in the immediately previous synchronization. As a result, the server would return a "no match" result to the client, and the client would send the elements C, E, and F comprising the chunk to the server. At the server, the server would determine that the element D had been deleted at the client and the server would delete its corresponding record at the server, restoring the directories 202a and 202b to synchronization.

Figure 3:
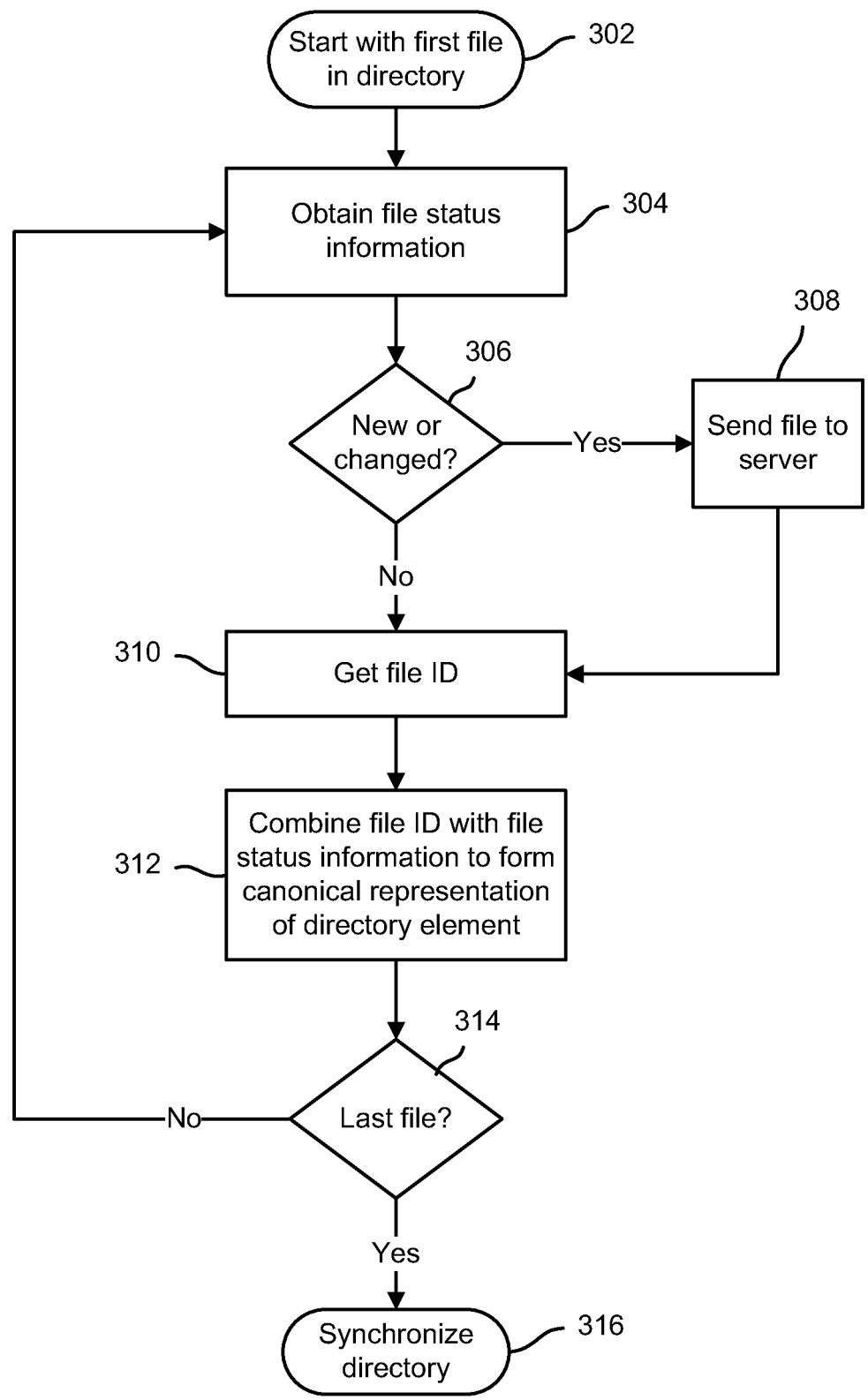
FIG. 3 is a flow diagram illustrating an embodiment of a process to synchronize filesystem information.

FIG. 3 is a flow diagram illustrating an embodiment of a process to synchronize filesystem information. In the example shown, starting with a first file in a directory (302) file status information (and/or other file metadata) is obtained (304). Examples of file status information include the file's size and the time it was last modified. If the file is new or changed (since last backup or other replication) (306), the file is sent to the server (or other replication destination, local or remote) (308). If the file has not changed and/or once the file or changes thereto have been sent (306, 308), the file ID of the file is obtained (310) and combined with the file status information to form a canonical representation of the directory element (312). The process is repeated for each file in the directory until the last file in the directory has been processed (314), at which time in the example shown synchronization of the directory between the client and the server begins (316).

Figure 4:
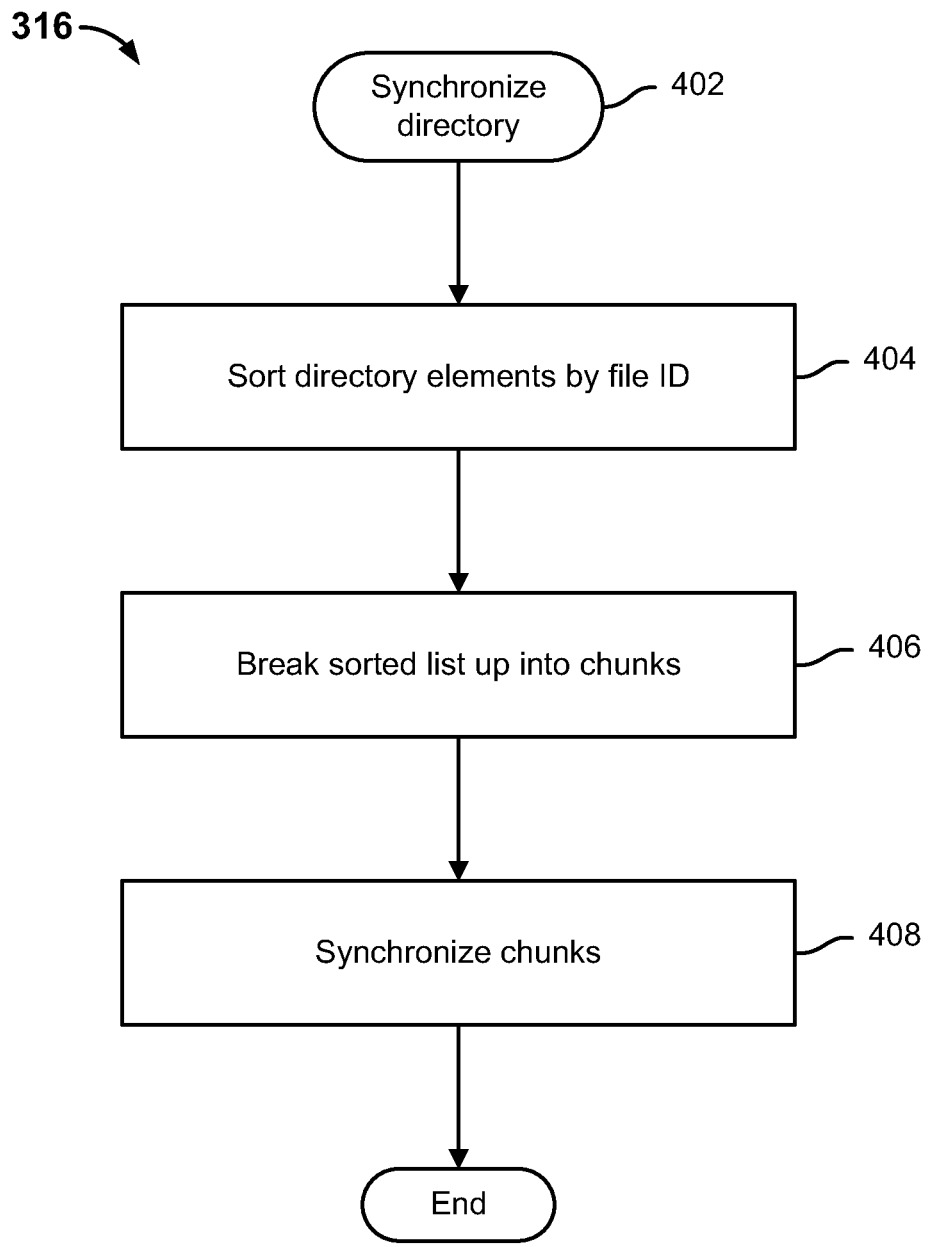
FIG. 4 is a flow diagram illustrating an embodiment of a process for synchronizing filesystem information.

FIG. 4 is a flow diagram illustrating an embodiment of a process for synchronizing filesystem information. In some embodiments, the process of FIG. 4 implements 316 of FIG. 3. In the example shown, when a directory is ready to be synchronized (402), i.e., for each file in the directory a canonical representation of associated directory element metadata has been created, the directory elements comprising the directory are sorted in a canonical order, e.g., by file ID (404). The sorted list is broken up into chunks each comprising one or more directory elements (406). In various embodiments, the size and/or boundaries of chunks may be determined by one or more predetermined and/or dynamically determined criteria, including chunk size and/or data indicating a relationship (or not) between adjacent elements, e.g., based on last modified time, access rights, etc. The respective chunks are then used to synchronize the directory information between the client and the server (408).

Figure 5:
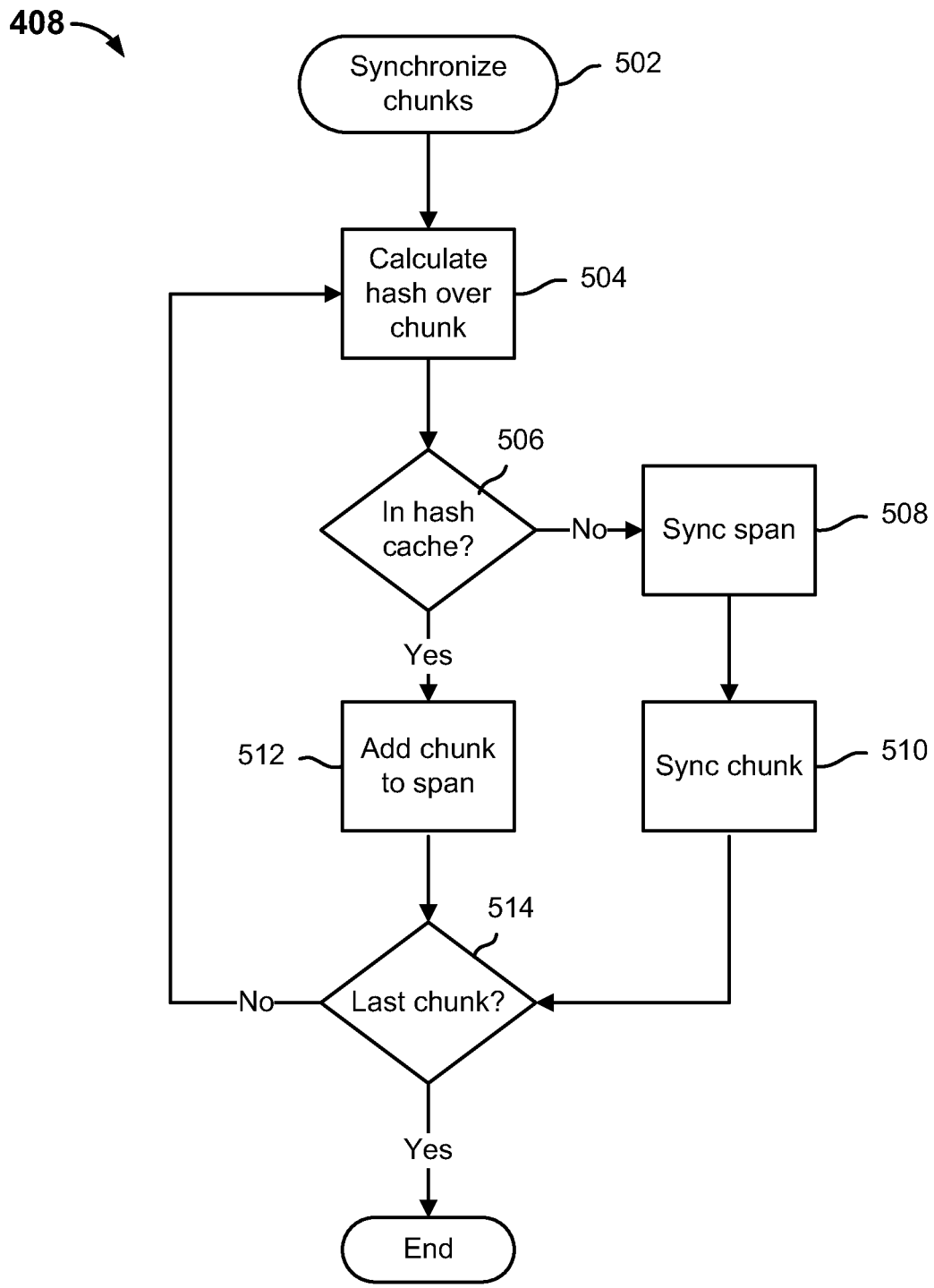
FIG. 5 is a flow diagram illustrating an embodiment of a process for using chunks of directory elements to synchronize a directory.

FIG. 5 is a flow diagram illustrating an embodiment of a process for using chunks of directory elements to synchronize a directory. In some embodiments, the process of FIG. 5 implements 408 of FIG. 4. In the example shown, when ready to synchronize a directory based on a set of directory elements sorted in a canonical order (502), the client starts with a first chunk of directory elements and computes a hash based on them (504). If the hash is stored in a local hash cache (506), it is known to be on the server. In the example shown, if the hash for a chunk is found in the cache it is added to a span of consecutive chunks found in the hash (512). If the hash is not in the hash cache, the current span (if any chunks are in it) and the chunk are synchronized (508, 510) with the server. Iterations of the process are repeated for chunks comprising the directory until a last chunk has been processed (514).

Figure 6:
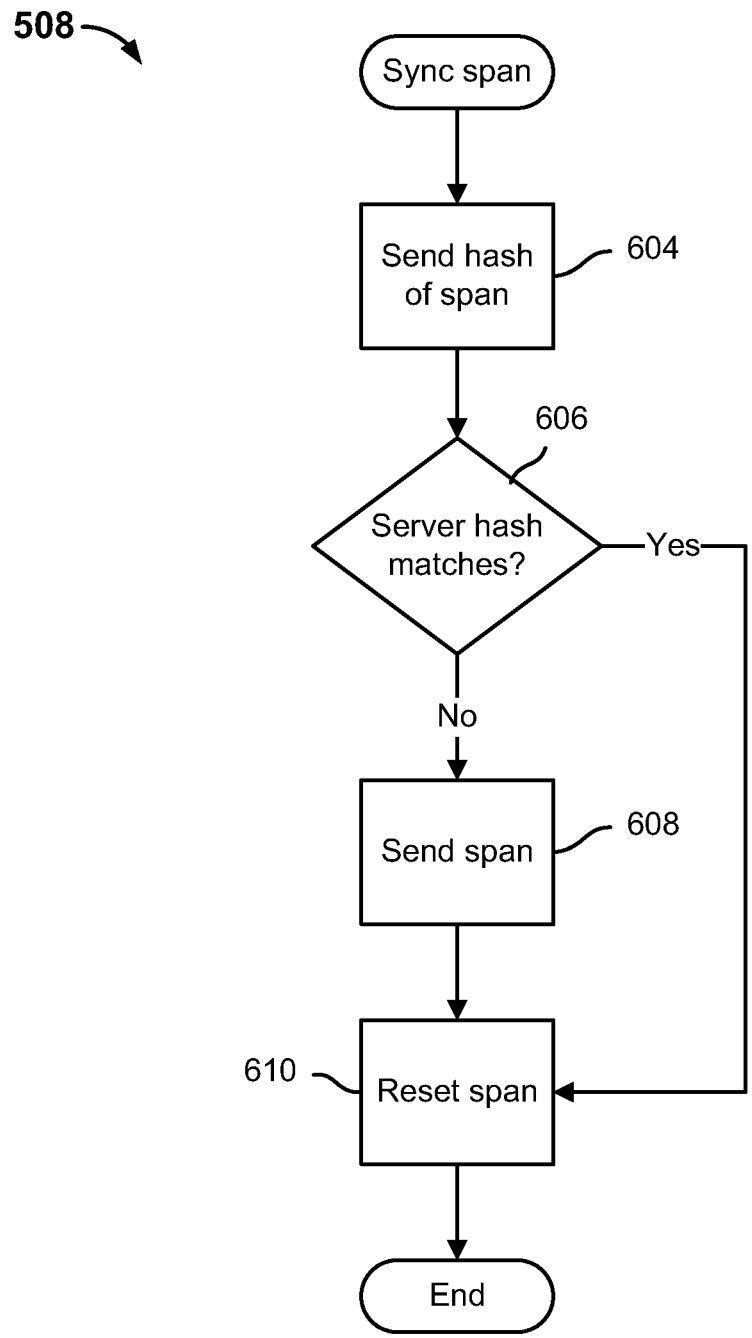
FIG. 6 is a flow diagram illustrating an embodiment of a process for synchronizing a span of chunks of directory service elements.

FIG. 6 is a flow diagram illustrating an embodiment of a process for synchronizing a span of chunks of directory service elements. In various embodiments, the process of FIG. 6 implements 508 of FIG. 5. In the example shown, to synchronize a span a hash of the span and an associated offset indicating a location and extent of the span in the sorted list of directory elements is sent to the server (604). The server computes a hash for the corresponding directory information as stored at the server, i.e., for a span of the indicated extent at the indicated offset, and informs the client whether the result matched the value sent by the client. If the server indicates the hash did not matched (606), the span of directory elements is sent to the server (608). Once the span has been sent (608), or if the hash was determined to match (606), at the client the span is reset (610) and the process ends. The next chunk, if any, added to the reset span would become the first chunk in the span.

Figure 7:
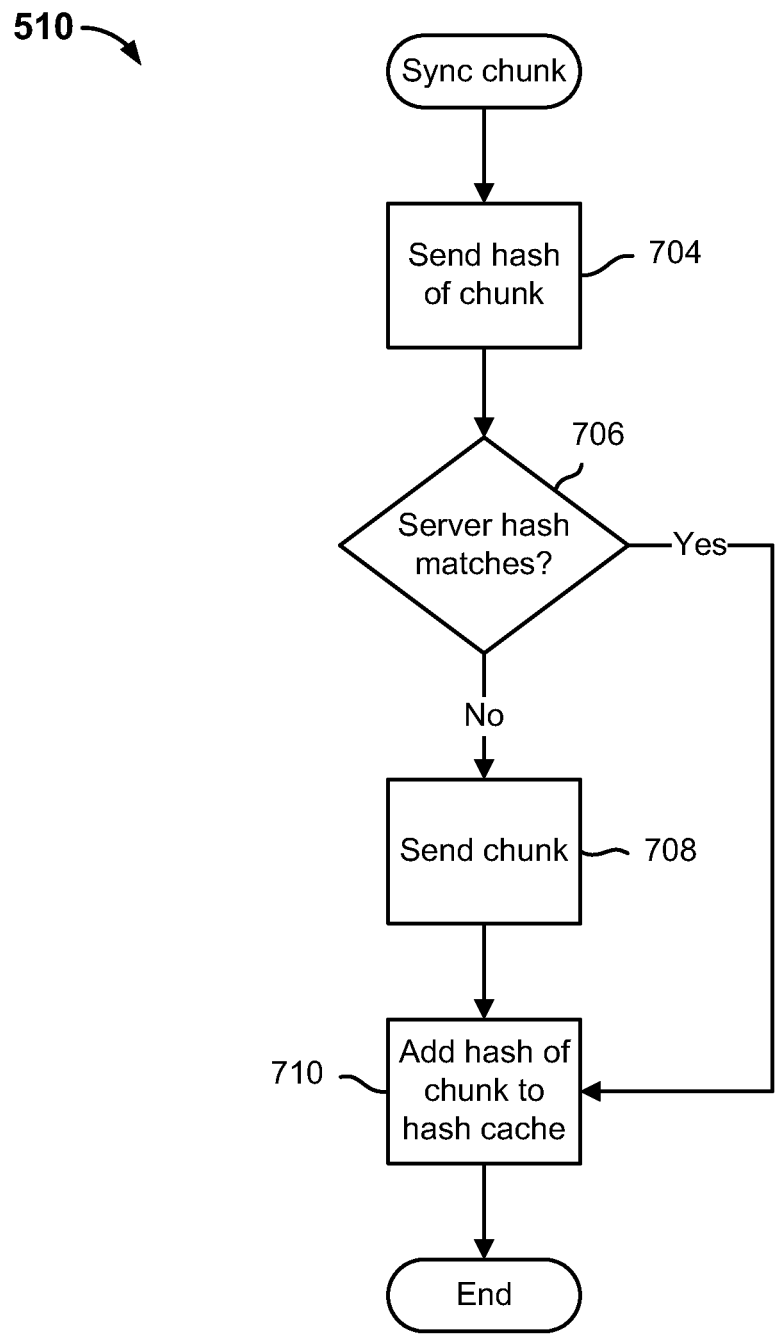
FIG. 7 is a flow diagram illustrating an embodiment of a process for synchronizing a chunk of directory service elements.

FIG. 7 is a flow diagram illustrating an embodiment of a process for synchronizing a chunk of directory service elements. In various embodiments, the process of FIG. 7 implements 510 of FIG. 5. In the example shown, to synchronize a chunk of directory elements the client computes a hash of the chunk and sends the hash and associated offset information to the server (704). If the client receives from the server an indication that the corresponding hash computed by the server did not match the hash sent by the client (706), the client sends the directory elements comprising the chunk to the server (708). Once the chunk has been sent (708), or if the hash was determined to match (706), at the client the hash of the chunk is added to the local hash cache (710) and the process ends.

Figure 8:
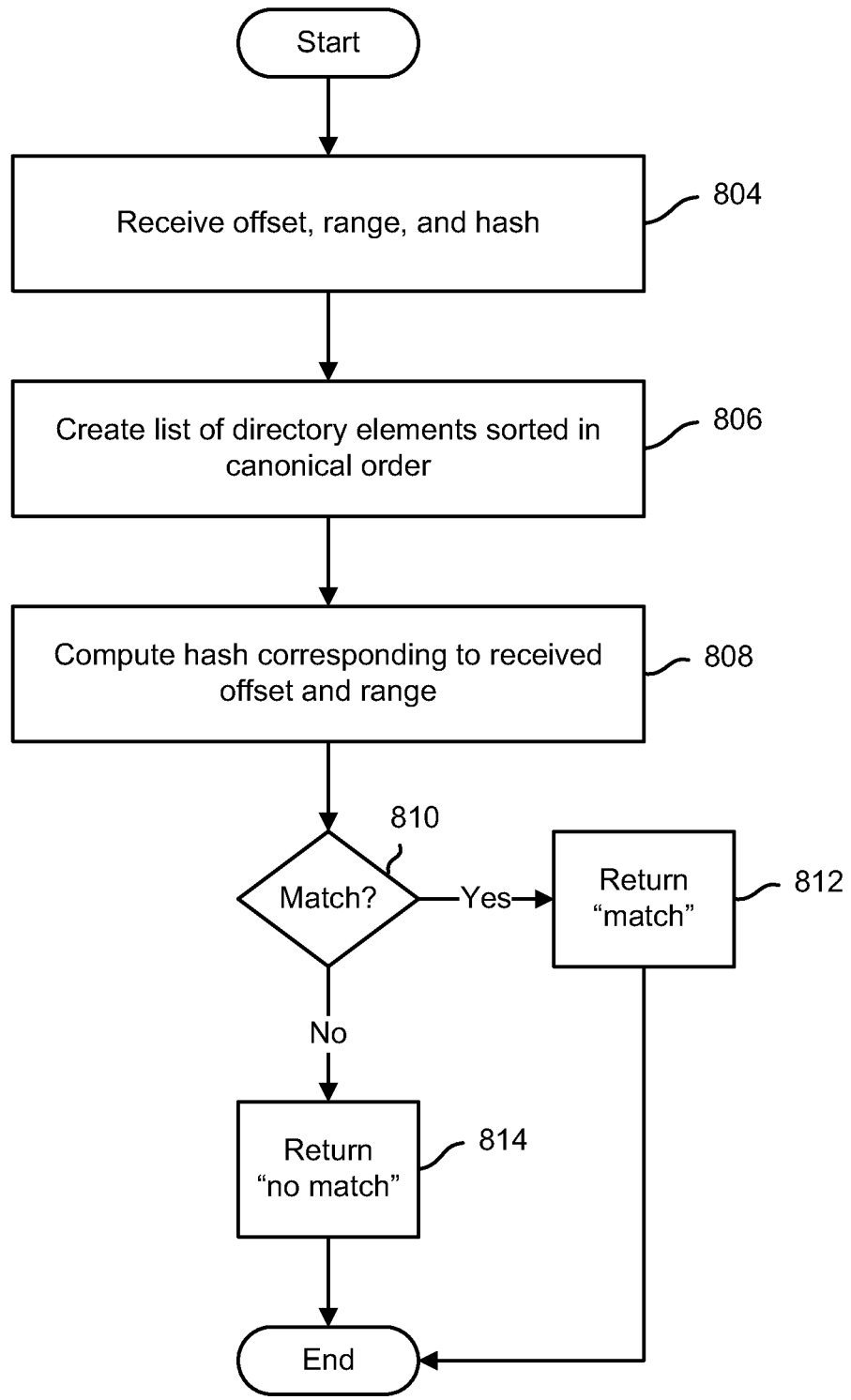
FIG. 8 is a flow diagram illustrating an embodiment of a process for calculating and comparing hash values based on directory information.

FIG. 8 is a flow diagram illustrating an embodiment of a process for calculating and comparing hash values based on directory information. In some embodiments, the process of FIG. 8 is implemented on a server to which filesystem information is replicated. In the example shown, a hash value and associated directory element offset and extent information for a chunk of directory elements or a span of such chunks is received, e.g., from a client (804). A list of directory elements for a corresponding directory, sorted in a canonical order, is created (806). A hash of directory elements corresponding to the received offset and extent, as stored on the server, is computed (808) and compared to the received hash value. If they match (810), a "match" result is returned to the client (812). If they do not match (810), a "no match" result is returned (814).

In the event a "no match" result is returned, in various embodiments the client may send the associated directory elements. The server is configured to receive the elements and use them to update corresponding information stored at the server.

Figure 9:
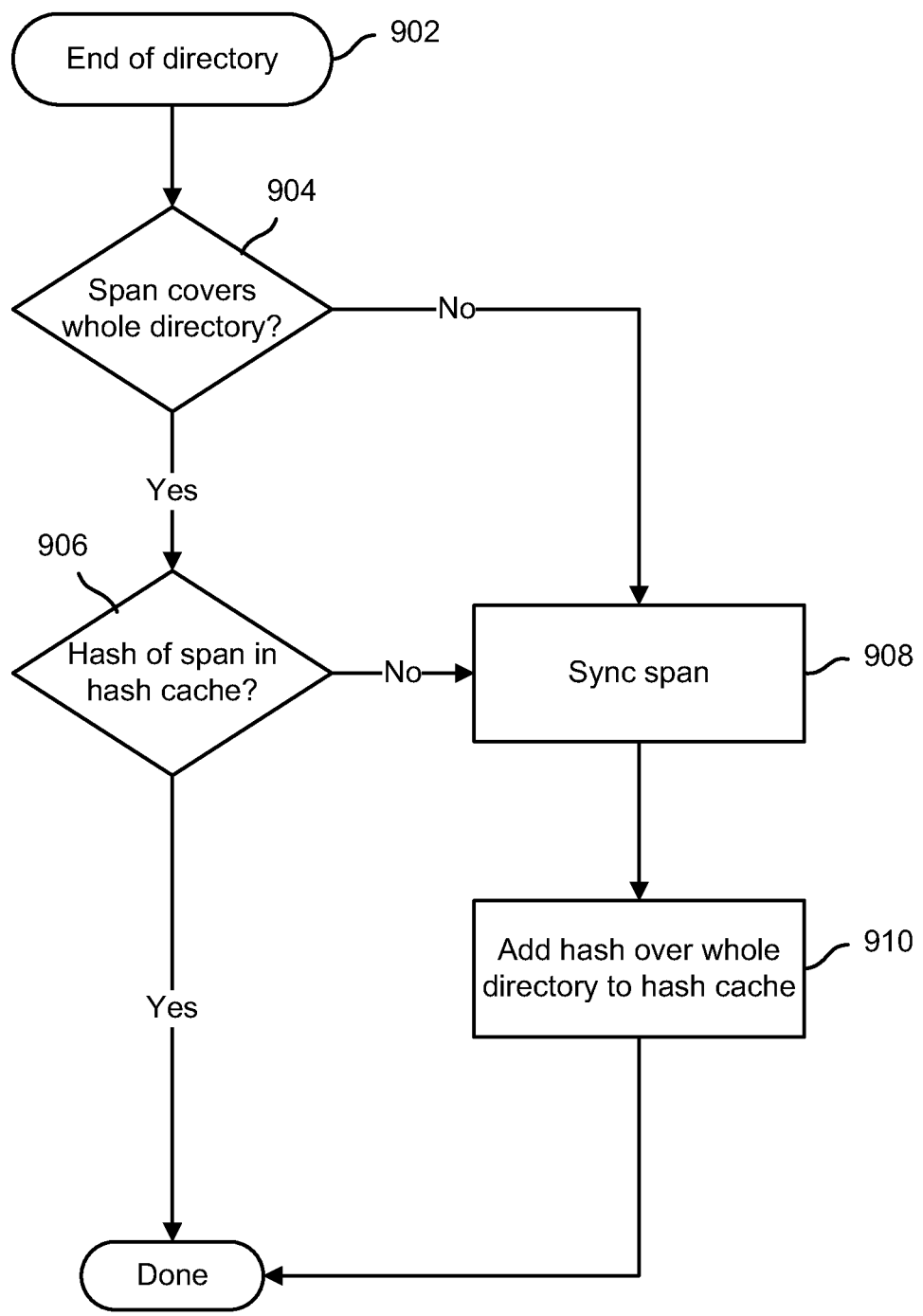
FIG. 9 is a flow diagram illustrating an embodiment of a process to synchronize a span comprising an entire directory.

FIG. 9 is a flow diagram illustrating an embodiment of a process to synchronize a span comprising an entire directory. In the example shown, a further optimization is performed in the event the end of a directory is reached and it is determined that the current span includes all chunks comprising the directory. An example of such an occurrence is the situation in which all of the chunks comprising the directory are found in the hash cache at the client, for example because all had been synchronized in a prior synchronization and none of the filesystem information for the directory has changed since. In the example shown, upon reaching the end of processing the chunks comprising a directory (902) a check is performed to determine whether the current span covers the whole directory (904). If so, a check is performed to determine whether the hash of the span is present in the hash cache (906). If the hash of the directory-wide span is found in the hash cache the process ends. If upon reaching the end of the directory the span does not cover the whole directory (904), or if the hash of the directory-wide span is not already in the hash cache (908), then the span is synchronized (908) and the hash of the entire directory (i.e., all chunks comprising the directory) is added to the hash cache (910).

In some embodiments, in a subsequent synchronization the client prior to dividing the directory elements of a directory into chunks and proceeding as described above first computes a hash over the entire ordered list of directory elements and checks the hash cache for the result. If the hash over the whole directory is in the hash cache, the client knows the directory as stored on the server is in sync and moves on to the next directory, if any. Otherwise, the client chunks and processes the sorted list as described above.

In some embodiments, neither the file cache nor the hash cache needs to be comprehensive; that is, not all files on the client filesystem nor all chunks of metadata need to be represented if local storage is at a premium. If a file is not found in the file cache, or the hash of a chunk of metadata is not found in the hash cache, because one or both are space limited, then the file or chunk will just be resent. This allows for flexibility in trading off local storage for bandwidth savings while remaining correct. By contrast, the journaling approach requires that all operations since the last backup be saved in order to remain correct.

The file and hash caches essentially implement a very space efficient and flexible catalog system. The techniques and protocol described herein in various embodiments allow the file and hash caches to be used to synchronize a multitude of local filesystem implementations (NTFS, ext3, etc.) with a multitude of remote filesystem implementations (Avamar FS, Data Domain FS, etc.).

Figure 10:
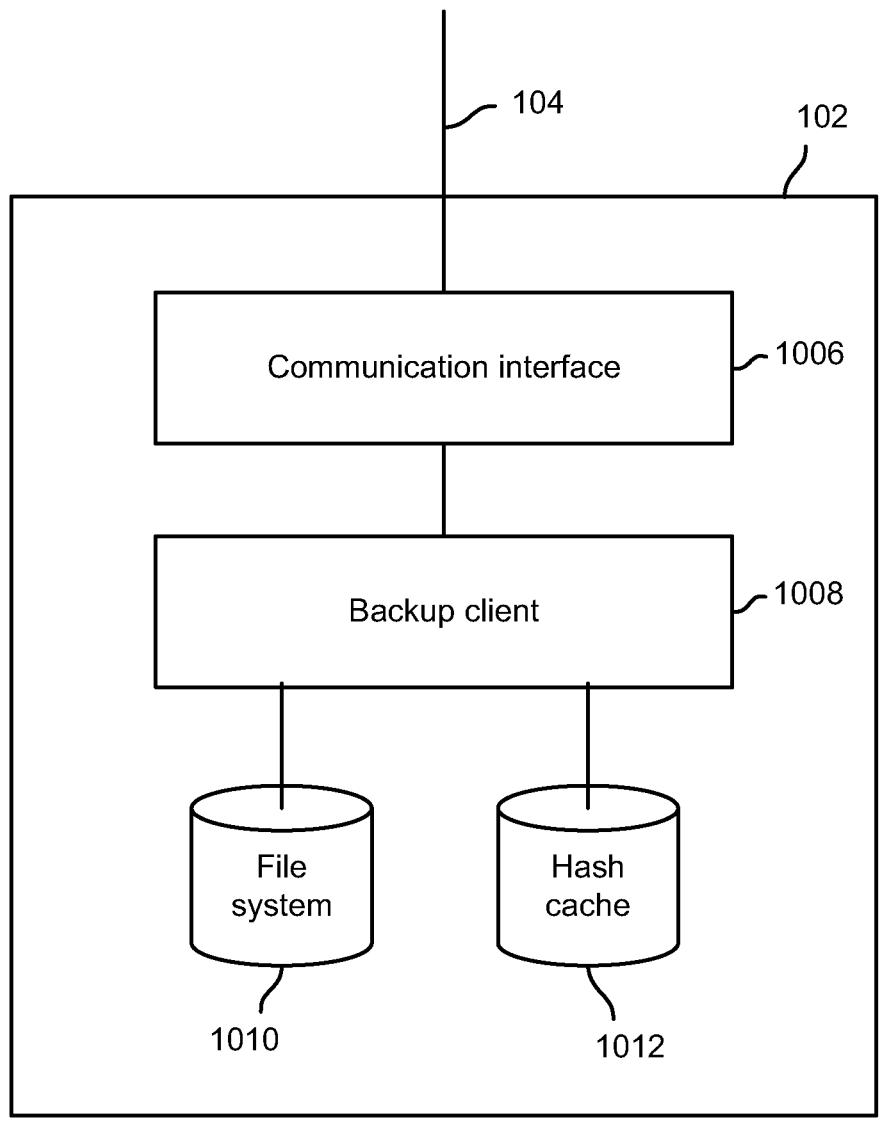
FIG. 10 is a block diagram illustrating an embodiment of a computer system.

FIG. 10 is a block diagram illustrating an embodiment of a computer system. In the example shown, a backup client system 102 (which may be a server with respect to one or more functions and/or network elements not shown, for example a file server) has network connectivity via a connection 104 and a communication interface 1006, such as a network interface card (NIC). A backup client 1008 communicates via communication interface 1006 and connection 104 to replicate files stored in a file system 1010, and associated filesystem information, over a network to a remote server. In various embodiments, the backup client 1008 comprises a software agent and/or other code running on a processor comprising the system 102. The backup client 1008 uses a hash cache 1012, stored for example in a memory or other data storage device comprising system 102, as described above, to efficiently synchronization filesystem information associated with file system 1010 with the remote server.

While in a number of embodiments described herein files and associated filesystem information are replicated and/or synchronized across a network, in other embodiments techniques described herein may be used in other environments, e.g., backup to a local backup or other storage node. In addition, while files and filesystem metadata are described in various embodiments, techniques described herein may be used to synchronize metadata about other stored objects stored or represented in a hierarchical or other manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of synchronizing filesystem changes, comprising:
   sorting, in a canonical order, a list of directory elements wherein each directory element includes a canonical representation of metadata associated with a node in the filesystem;
   determining a chunk of directory elements comprising one or more consecutive directory elements by breaking up the sorted list of directory elements sorted in a canonical order;
   computing at a client system a hash of data comprising the chunk of directory elements sorted in canonical order;
   determining based at least in part on the computed hash whether the corresponding directory elements as stored on the remote server are identical to the directory elements comprising the chunk as stored on the client system, wherein the determining whether the corresponding directory elements as stored on the remote server are identical to the directory elements comprising the chunk as stored on the client system comprises determining whether the computed hash is previously stored in a hash cache on the client system; and
   in the event that the computed cache was not previously stored in the hash cache,
      sending, to the remote server, the computed hash and information from which the remote server computes a verification hash, wherein the computed hash is compared to the verification hash to determine whether the corresponding directly elements as stored on the remote server are identical to the directory elements comprising the chunk as stored on the client system; and
      sending the one or more directory elements comprising the chunk to a remote server in the event it is determined based at least in part on the computed hash that corresponding directory elements as stored on the remote server are not identical to the directory elements comprising the chunk as stored on the client system,
   wherein at least a portion of the one or more directory elements comprising the chunk that are sent to the remote server correspond to at least a subset of changes in data stored at the client system since a previous synchronization between the remote server and the client system.

2. The method of claim 1, further comprising receiving from the remote server an indication whether a corresponding hash corresponding to the computed hash and computed by the server based on corresponding filesystem information stored on the server matched the computed hash.

3. The method of claim 2, further comprising adding the computed hash to the hash cache if the response from the server indicates that the corresponding hash matched the computed hash.

4. The method of claim 3, further comprising adding the computed hash to the hash cache once the one or more directory elements comprising the chunk have been sent to the remote server in response to receiving from the server an indication that the corresponding hash computed at the server did not match the computed hash sent by the client system.

5. The method of claim 1, further comprising adding the computed hash to a span of consecutive chunks, if any, the respective hashes of which have been found in the hash cache, in the event the computed hash is found in the hash cache.

6. The method of claim 5, further comprising synchronizing the span and the chunk if the computed hash is not found in the hash cache.

7. The method of claim 6, wherein synchronizing the span includes sending to the remote server a hash of directory elements comprising chunks included in the span.

8. The method of claim 7, further comprising sending directory elements comprising chunks included in the span to the remote server in the event an indication is received that a corresponding hash computed based on directory elements stored on the server that correspond to elements comprising the chunks included in the span as stored on the client system did not match the hash of directory elements comprising chunks included in the span sent by the client system.

9. The method of claim 5, further comprising:
determining upon reaching an end of the set of elements that the span covers the entire set of elements; and
ensuring that a hash of the entire set of elements is stored in the hash cache.

10. The method of claim 9, further comprising checking at the outset of a synchronization of the set of elements whether said hash of the entire set of elements is stored in the hash cache; and concluding without further processing that the set of elements are in sync between the client system and the remote server if the hash of the entire set of elements is found in the hash cache.

11. The method of claim 9, further comprising synchronizing the span if upon reaching the end of the set of elements it is determined that the span does not cover the entire set of elements.

12. The method of claim 1, wherein each of the directory elements comprises a canonical representation of metadata comprising filesystem information associated with a corresponding file in a directory with which the directory elements are associated.

13. The method of claim 12, further comprising generating the respective canonical representations.

14. The method of claim 13, further comprising sorting the directory elements in the canonical order.

15. The method of claim 1, wherein the information from which the server computes the verification hash comprises an offset of a first file represented by the chunk associated with the hash, and a number of files represented by the chunk associated with the hash.

16. The method of claim 1, wherein the verification hash is computed based at least in part on the information received from the client system and corresponding information stored at the remote server.

17. A computer system, comprising:
a processor configured to:
sort, in a canonical order, a list of directory elements wherein each directory element includes a canonical representation of metadata associated with a node in the filesystem;
determine a chunk of directory elements comprising one or more consecutive directory elements by breaking up the sorted list of directory elements sorted in a canonical order;
compute a hash of data comprising the chunk of directory elements comprising sorted in canonical order;
determine based at least in part on the computed hash whether the corresponding directory elements as stored on the remote server are identical to the directory elements comprising the chunk as stored on the client system, wherein the determining whether the corresponding directory elements as stored on the remote server are identical to the directory elements comprising the chunk as stored on the client system comprises determining whether the computed hash is previously stored in a hash cache on the client system; and
in the event that the computed cache was not previously stored in the hash cache,
send, to the remote server, the computed hash and information from which the remote server computes a verification hash, wherein the computed hash is compared to the verification hash to determine whether the corresponding directly elements as stored on the remote server are identical to the directory elements comprising the chunk as stored on the client system; and
send the one or more directory elements comprising the chunk to a remote server in the event it is determined based at least in part on the computed hash that corresponding directory elements as stored on the remote server are not identical to the directory elements comprising the chunk as stored on the computer system; and
a storage device coupled to the processor and configured to store data comprising the directory elements,
wherein the one or more directory elements comprising the chunk that are sent to the remote server correspond to at least a subset of changes in data stored on the storage device since a previous synchronization between the remote server and the computer system.

18. The system of claim 17, further comprising a communication interface couple to the processor and configured to be used by the processor to send the one or more directory elements comprising the chunk to the remote server.

19. The system of claim 17, wherein each of the directory elements comprises a canonical representation of metadata comprising filesystem information associated with a corresponding file in a directory with which the directory elements are associated and the processor is configured to generate the canonical representations.

20. The system of claim 17, wherein the processor is configured to sort the directory elements in the canonical order.

21. The system of claim 17, wherein the processor is further configured to add the computed hash to the hash cache if the one or more directory elements comprising the chunk are sent to the remote server.

22. A computer program product for synchronizing filesystem changes, the computer program product being embodied in a non-transitory computer readable storage medium and comprising computer instructions for:

sorting, in a canonical order, a list of directory elements wherein each directory element includes a canonical representation of metadata associated with a node in the filesystem;

determining a chunk of directory elements comprising one or more consecutive directory elements by breaking up the sorted list of directory elements sorted in a canonical order;

computing at a client system a hash of data comprising a chunk of directory elements comprising one or more consecutive directory elements in a set of elements sorted in a canonical order;

determining based at least in part on the computed hash whether the corresponding directory elements as stored on the remote server are identical to the directory elements comprising the chunk as stored on the client system, wherein the determining whether the corresponding directory elements as stored on the remote server are identical to the directory elements comprising the chunk as stored on the client system comprises determining whether the computed hash is previously stored in a hash cache on the client system; and in the event that the computed cache was not previously stored in the hash cache,
sending, to the remote server, the hash and information from which the remote server computes a verification hash, wherein the hash is compared to the verification hash to determine whether the corresponding directly elements as stored on the remote server are identical to the directory elements comprising the chunk as stored on the client system; and sending the one or more directory elements comprising the chunk to a remote server in the event it is determined based at least in part on the computed hash that corresponding directory elements as stored on the remote server are not identical to the directory elements comprising the chunk as stored on the client system, wherein at least a portion of the one or more directory elements comprising the chunk that are sent to the remote server correspond to at least a subset of changes in data stored at the client system since a previous synchronization between the remote server and the client system.

* * * * *